United States Patent [19]

Hukvari et al.

[11] Patent Number: 4,882,128
[45] Date of Patent: Nov. 21, 1989

[54] PRESSURE AND TEMPERATURE REACTION VESSEL, METHOD, AND APPARATUS

[75] Inventors: Istvan S. Hukvari; Henry J. Albert, both of Bettendorf, Iowa; Vernon G. Moon, Moline, Ill.; Michael R. Steffenson, Davenport, Iowa

[73] Assignee: Parr Instrument Company, Moline, Ill.

[21] Appl. No.: 80,037

[22] Filed: Jul. 31, 1987

[51] Int. Cl.⁴ ............................................. B01J 19/24
[52] U.S. Cl. ............................. 422/119; 219/10.55 E; 422/240; 422/242
[58] Field of Search ................. 422/51, 113, 119, 242, 422/240; 219/10.55 E

[56] References Cited

U.S. PATENT DOCUMENTS

| 342,618 | 5/1886 | Mann | 422/113 |
|---|---|---|---|
| 511,629 | 12/1893 | Lyon | 422/113 |
| 1,311,957 | 8/1919 | Ferris | 220/208 |
| 1,795,780 | 4/1928 | Kiernan | 266/171 |
| 2,547,521 | 4/1951 | Buehler | 422/242 X |
| 2,944,697 | 7/1960 | Mays | 220/327 |
| 3,285,061 | 11/1966 | Hegenbart | 73/862.58 |
| 3,313,599 | 4/1967 | Boon | 422/242 |
| 3,738,308 | 6/1973 | Barabino | 116/34 R |
| 3,961,533 | 6/1976 | Bennett | 73/744 |
| 4,022,582 | 5/1977 | Louthan et al. | 422/241 |
| 4,248,831 | 2/1981 | Hughes | 422/242 X |
| 4,340,576 | 7/1982 | Strong | 422/240 X |
| 4,406,860 | 9/1983 | Beauvais et al. | 219/10.55 E |
| 4,456,186 | 6/1984 | Ando | 422/174 X |
| 4,457,327 | 7/1984 | Pepper | 422/113 X |
| 4,490,597 | 12/1984 | Mengel | 219/10.55 E |
| 4,613,738 | 9/1986 | Saville | 219/10.55 E |
| 4,736,083 | 4/1988 | Saville | 219/10.55 E |

OTHER PUBLICATIONS

Parr Instrument Company—Bulletin 4743, 3/86 "Teflon Lined Acid Digestion Bombs".
Berghof Publication 14029 All, Teflon Digestion Vessel Jul. 1986 Catalog.
CEM Publication, 1985 Copyright by CEM Uniseal Decomposition Vessels Ltd.
"Introducing Uniseals New Pressure Measuring System", (T.P.S. 8002).
NASA Tech Brief, Brief 68-10104, Mar. 1968.

Primary Examiner—Barry S. Richman
Assistant Examiner—Jill Johnston
Attorney, Agent, or Firm—Seed and Berry

[57] ABSTRACT

A pressure and temperature reaction vessel is constructed from substantially microwave-transmissible materials. The vessel includes pressure-relief vents and a sliding seal which isolates a pressure reaction chamber from the vents. A visual indicator is operatively associated with the sliding seal to indicate pressure within the reaction chamber. At pressures above a preselected limit, the sliding seal becomes unsupported and the reaction chamber is fluidly communicated with the vents.

14 Claims, 1 Drawing Sheet

PRESSURE AND TEMPERATURE REACTION VESSEL, METHOD, AND APPARATUS

TECHNICAL FIELD

The invention relates to methods and apparatus for conditioning chemical and physical reactions. More specifically, the invention relates to methods and apparatus for conducting chemical and physical reactions at elevated temperatures and pressures.

BACKGROUND ART

Many organic and inorganic reactions can be accelerated if the reaction occurs at an elevated temperature or pressure, or both. Pressure and temperature reaction vessels, commonly referred to as "bombs," have been developed for this purpose. Such bombs are also known as "decomposition vessels," "reduction bombs," and "pressure bombs." Such bombs typically comprise a containment vessel manufactured from stainless steel or other corrosion-resistant alloys. The vessel defines a reaction chamber which is sealable with a lid.

To cause or accelerate a reaction, reactants are introduced into the vessel and the lid sealed. The vessel is then heated in a variety of ways. Vessels are typically heated by convection in ovens, or conduction in water baths, sand baths, oil baths, mantels, or block heaters. In all cases, heat is externally generated and transferred to the vessel by conduction or convection. The reactants are thus heated by conduction through the vessel walls.

It is relatively important that the pressure and temperature limits of the bomb not be exceeded. For bombs of this type, it is relatively simple to determine the pressure which exists in the bomb because bomb pressures are ordinarily a function of the reactant temperature and any exothermic reaction which may be occurring inside the bomb. In the absence of an exothermic reaction, the bomb temperature is always less than or equal to the temperature of the oven or other device which is used to heat the bomb. The partial pressure of gases developed within the bomb must be estimated.

While such bombs have been advantageously used in research and in industry, a number of disadvantages are associated with these bombs. The cycling of reactions through various heating stages is slow, as it is often necessary to allow the bomb to cool (i.e., to add another reactant, etc.) before a subsequent heating can commence. Substantial amounts of energy are wasted in convection heating. The rate of energy transfer by conduction and convection is relatively slow. Using convection heating, it typically takes 2 hours for the bomb to reach a desired temperature of 200°–250° C. Subsequent cooling of the bomb to handling temperature takes a corresponding time period. Thus, cycle periods of 4 hours are not uncommon.

A microwave-transmissible reaction vessel consisting essentially of a microwave-transmissible cup with a screw-on cap is available to provide rapid heating of reactants by exposure to microwaves. This reaction vessel is disadvantageously incapable of withstanding substantially elevated internal pressures. Furthermore, this vessel does not provide for the safe relief of internal pressure should an over-pressure condition occur nor for indication of pressure achieved in the vessel.

DISCLOSURE OF THE INVENTION

It is an object of the present invention to provide a pressure and temperature reaction vessel in which reactants may be safely heated to relatively high pressures and temperatures by exposure to microwave electromagnetic radiation.

It is another object of the present invention to provide a pressure and temperature reaction vessel which provides an external visual indication of gas pressure within the vessel.

It is yet another object of the invention to provide a mechanism for releasing pressure from a reaction vessel due to undesirable thermal expansion of internal components.

The invention achieves these objects, and other objects and advantages which will become apparent from the description which follows, by providing a microwave-transmissible pressure and temperature reaction vessel having a microwave-transmissible visual indicator to indicate pressure within the vessel. In the preferred embodiment, a pressure and temperature reaction vessel is provided which utilizes a containment housing having a vent, a seal movable between two positions for sealing a reaction chamber from the vent, and a visual indicator which is operatively associated with the movable seal to indicate the position of the movable seal and thus the pressure within the reaction chamber.

In the preferred embodiment, the containment housing, movable seal, and visual indicator are constructed from microwave-transmissible materials and the reactants contained in the reaction chamber are heated by microwave radiation. A biasing mechanism is also provided to bias the movable seal to a first sealing position and to apply a reaction force on the movable seal in response to pressure generated within the reaction chamber.

The containment housing can be provided with a removable liner which, when used with a removable lid, defined and isolates the reaction chamber from the containment housing. The lid has a shoulder which receives an O-ring seal. The O-ring seal is slidably engageable with an interior wall of the liner to seal the reaction chamber from the containment housing vent. The visual indicator can include an elongated portion having two ends. One end is connected to a retaining plate which secures an elastic member between the retaining plate and one portion of the housing. The elongated portion of the visual indicator is reciprocally received in a bore in the housing. The other end of the visual indicator protrudes from the housing as the elastic member is compressed.

When the lid, liner, and containment housing are assembled, displacement of the seal support and seal from the first sealing position causes one end of the visual indicator to protrude from the bore in response to pressure generated within the reaction chamber. When a preselected pressure limit is achieved, the elastic member is compressed to a point where the O-ring loses support from the walls of the liner. The reaction chamber is thus communicated with the vent in the containment housing to safely release the pressurized gas. The housing is also constructed so as to communicate the reaction chamber with the vent if the liner exhibits undesirable thermal expansion, which might interfere with normal operation of the sliding seal.

In the preferred method of the present invention, the above-described reaction vessel is charged with reactants and exposed to microwave radiation. The vessel itself is substantially transparent to microwave radiation and is thus not heated. However, the reactants are rapidly heated and pressure is generated within the reaction chamber. The visual indicator provides a means for monitoring the pressure achieved within the reaction vessel. The operator can use this information to adjust the exposure time in subsequent reactions. In the even that an overpressure condition occurs, the reaction chamber is vented safely through the vent, without exceeding the structural limitations of the containment housing.

BEST MODE FOR CARRYING OUT THE INVENTION

Figure 1:
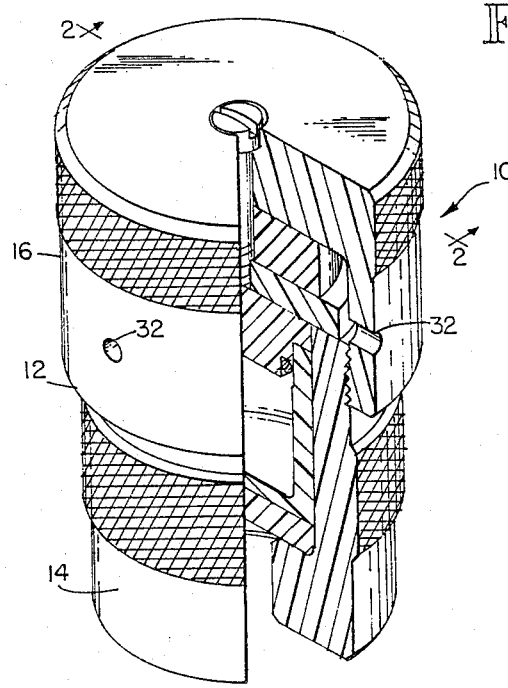
FIG. 1 is an isometric view of a pressure and temperature reaction vessel in accordance with the present invention; a section of the vessel is cut away.

A microwave-transmissive, acid-digestion bomb, in accordance with the present invention, is generally indicated at reference numeral 10 in FIG. 1. The bomb is useful in digesting organic and inorganic laboratory samples. The bomb is constructed entirely from substantially microwave-transparent materials. Reactants heated within the bomb by microwave radiation can reach temperatures in the range of 200° C. within one minute when the bomb is exposed to microwave radiation from a conventional microwave oven. A rapid cycling time of approximately 20 to 30 minutes, including cooling, is possible as the bomb itself does not absorb microwave radiation. This rapid cycling capability is especially advantageous where multiple samples may be treated or in procedures which include several steps. For example, different acids can be added to dissolve inorganic materials after an organic matrix has been destroyed.

Figure 2:
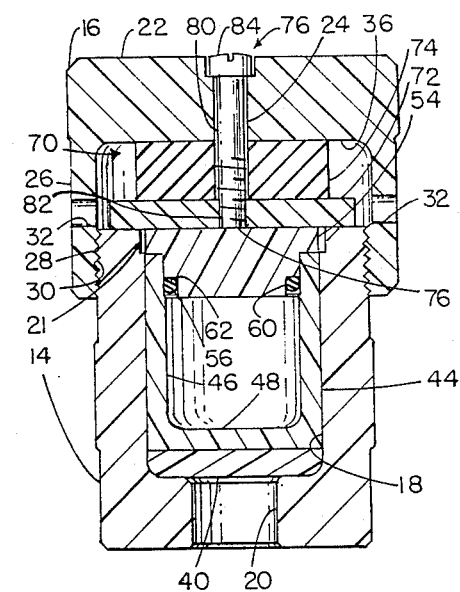
FIG. 2 is a reduced, sectional, elevational view taken along line 2—2 of FIG. 1. A sliding seal in accordance with the present invention is shown in a first sealing position.
Figure 3:
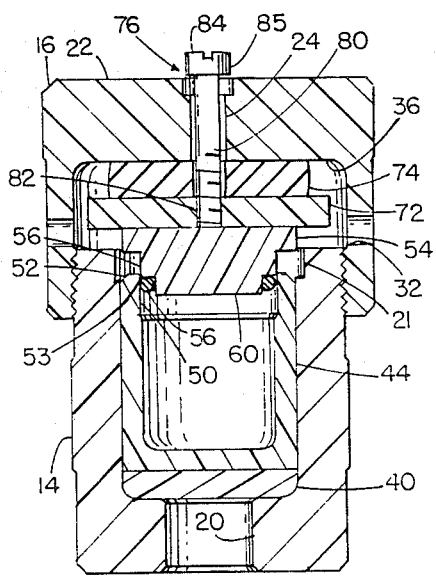
FIG. 3 is a sectional elevational view similar to FIG. 2 wherein the seal is shown in a second sealing position.
Figure 4:
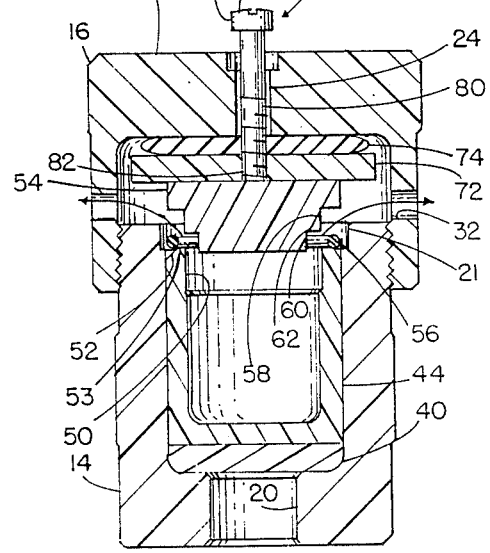
FIG. 4 is a sectional elevational view similar to FIGS. 2 and 3 in which the seal is shown in a non-sealing position in which pressure is released from the reaction chamber in the direction of the arrows.

As shown in the figures, the bomb 10 has a cylindrical containment housing 12. The containment housing has a lower section 14 which threadedly engages an upper section 16. As best seen in FIGS. 2 through 4, the lower section 14 defines a cylindrical interior cavity 18 and a reduced diameter, lower access passage 20. The lower section also defines an upper counterbore 21 opposite the access passage 20. The counterbore has a diameter which is slightly larger than the diameter of the interior cavity 18.

The upper section 16 includes a top 22 which defines a centrally located bore 24. The upper section also includes a downwardly depending annular flange 26 which has threads 28 at the end thereof. The threads 28 mate with threads 30 on the lower section. The upper section is also provided with vents 32, which fluidly communicate a cylindrical upper cavity 36 with the atmosphere.

The lower and upper sections 14, 16 are preferably constructed from a polyetheramide material which is capable of withstanding the axial and radial forces which are transferred to the containment housing. A preferred material is manufactured by General Electric Company under the trademark "Ultem 1000" ®. The primary qualities of this material which are important to the invention include high transmissibility of microwave radiation, high tensile strength, high temperature resistance, and resistance to chemical reaction with acids. The containment housing shown in the figures is designed to withstand pressure of at least 3000 psi, with failure typically occurring at 5000 psi, and temperatures of up to 100° C. As will be more fully described below, pressures in excess of 1200 psi are vented from the containment housing through vents 32, and due to the microwave transmissibility of the housing material, housing temperatures will typically remain below 50° C.

The interior cavity 18, defined by the lower section 14, forms a receptacle for a liner support plate 40 and a cylindrical liner 44. The liner has a cylindrical side wall 46. One end of the side wall is closed by a bottom 48 to form a cup with an open top. The liner also has an interior sealing surface 50 adjacent the open top of the liner. Beveled edges 52, 53 are provided on the exterior and interior of the liner adjacent to the open top.

The support plate 40 is preferably constructed from a polyetheramide material, as described above. The liner 44 is preferably constructed from a polytetrafluoroethylene material which is highly resistant to chemical decomposition. A suitable material is sold under the trademark "Teflon" ® by the E. I. DuPont de Nemours Company. This material is capable of withstanding temperatures up to 300° C. This material is also a relatively good thermal insulator. Therefore, reactants heated to temperatures up to 250° C. can be contained by the cylindrical liner 44.

The open top of the liner 44 is sealable by a movable seal support 54 and a sliding seal 56. The seal support 54 has a first section 58 which has a diameter slightly smaller than the inner diameter of the liner 44 at the interior sealing surface 50. The seal support also has an axially extending second section 60 having a diameter which is less than the diameter of the first section by an amount approximately equal to the thickness of the sliding seal 56. The sliding seal is of the conventional O-ring type and is preferably constructed from a polytetrafluoroethylene material, as are the liner and movable seal support 54. The perimeter of the second section 60 and the adjacent portion of the first section 58 thus forms a shoulder 62 for accepting the sliding seal 56.

As is best shown in FIGS. 2 and 3, the liner 44, movable seal support 54, and sliding seal 56 thus form a reaction chamber which is isolated from the vents 32 by the sliding seal 56. The sliding seal is movable between a first sealing position (shown in FIG. 2) when pressure within the reaction chamber is approximately equal to atmospheric pressure, and a second sealing position (shown in FIG. 3) when pressure within the reaction chamber is approximately equal to 1200 psi (gauge pressure). The outer circumference of the sliding seal 56 is slidably engaged with the interior sealing surface 50 of the liner 44 between the first and second positions. A biasing mechanism, generally indicated at reference numeral 70, provides a reaction force which opposes force exerted against the sliding seal and seal support generated by pressure within the reaction chamber.

When pressure within the reaction chamber exceeds approximately 1500 psi, the seal support 54 and sliding seal 56 are displaced from the position shown in FIG. 3 to a non-sealing position shown in FIG. 4. In this situation, the sliding seal 56 can ride over the top of the liner 44 and out of contact with the interior sealing surface 50. Pressurized gases are then free to escape from the cylindrical containment housing 12 through the vents 32. The sliding seal may or may not rest against the lower section 14 and beveled edge 52 (as shown in FIG. 4) while pressure is relieved.

The biasing mechanism 70 includes a retainer plate 72, a pressure-relief disk 74, and a visual indicator 76. The pressure-relief disk 74 is preferably constructed from a silicone rubber material which is transparent to microwave radiation.

The reaction force applied by the pressure-relief disk is transferred to the movable seal support 54 by the retainer plate 72. The pressure-relief disk is retained between the top 22 of the upper section 16 and the retainer plate by the visual indicator. The visual indicator has an elongated central section 80 which is free to reciprocate in the bore 24 defined by the top 22 of the upper section. One end 82 of the visual indicator is threadedly connected to the center of the retainer plate. The other end 84 of the visual indicator has a head 85 which protrudes slightly from the bore 24 when the sliding seal 56 is in the first sealing position, as shown in FIG. 2. The head 85 of the visual indicator 76 thus serves as a means for visually determining the position of the sliding seal 56.

The pressure-relief disk 74 has a modulus of elasticity such that, as pressure within the reaction vessel increases, the head 85 of the visual indicator will protrude approximately 1/32 inch for each 500-psi pressure increase within the reaction chamber. Thus, by monitoring the extension of the visual indicator after each reaction, the user will have a visual estimation of the pressure achieved within the bomb. In the event that pressure within the reaction chamber exceeds 1500 psi, the reaction chamber will be harmlessly vented through the vents 32, as shown in FIG. 4.

As stated above, the temperature of reactants in the reaction chamber can easily reach 200° C. when the bomb is exposed to microwaves from a conventional microwave oven for less than one minute. The insulative quality of the liner material will normally prevent any substantial, immediate temperature increase of the liner 44 itself. However, if the reactants are poor absorbers of microwave energy or if the power setting of the oven is relatively low (i.e., 100 to 250 watts), heating times on the order of 2 to 10 minutes are possible. Under these conditions, the liner 44 may absorb a substantial amount of heat energy from the reactants and exhibit substantial thermal expansion. With reference to FIG. 2, it can be seen that elongation of the liner side wall 46 will cause undesirable preloading of the pressure-relief disk 74 without any movement of the sliding seal 56 towards the non-sealing position shown in FIG. 4. Such undesirable preloading of the pressure-relief disk will thus prevent the sliding seal from achieving the non-sealing position at the desired maximum working pressure of 1200 psi.

The bomb 10 has a secondary pressure-relief mechanism to compensate for thermal expansion of the liner 44 which interferes with normal operation of the biasing mechanism 70 and sliding seal 56. This secondary pressure-relief mechanism basically comprises the counterbore 21 in the interior cavity 18. The counterbore has an axial depth selected such that the upper portion of the liner, adjacent to the seal support surface 50, will become radially unsupported, flex outwardly, and allow pressurized gas to by-pass the sliding seal 56 if the liner becomes axially distended due to a long heating period.

The reaction chamber defined by the liner 44, sliding seal 56, and movable seal support 54 has a working volume of approximately 23 milliters. When treating organic materials with nitric acid, for example, the dry weight of the organic material should not exceed 0.1 gram. The amount of concentrated nitric acid added to the organic material must not be less than 2.5 milliliters and should not be more than 3.0 milliliters. If the organic material has a mass of less than 0.1 gram dry weight, the amount of nitric acid should be proportionally reduced.

Samples weighing up to 1.0 gram can be used when treating inorganic materials in the bomb 10. In these digestions, the amount of acid added to the same must be controlled so that the total volume of sample plus acid or other digestion aid does not exceed 15 milliliters (two-thirds of the capacity of the liner 44).

The maximum safe reactant temperatures for inorganic digestions will vary with the type of acid used. For example, if 10 milliliters of concentrated (36%) HCl is used, the pressure developed at 223° C. will exceed the 1200-psi working limit for the bomb. However, if the HCl is diluted, the bomb can be heated to a higher temperature (260° C.). Diluting the acid will generally allow the use of higher temperatures to develop a given pressure. In addition, unlike water, reducing the amount of acid will usually produce a lower pressure at a given temperature.

The following procedure should be followed when loading and heating the bomb. The bomb should always be kept upright during assembly operations. To assemble the bomb from a disassembled state, place the lower section 14 upright on a flat surface. The liner support plate 40 should then be placed in the cylindrical interior cavity 18, flat side up. Assemble the liner 44, sliding seal 56, and seal support 54 as shown in FIG. 2, with the reactants contained within the defined reaction chamber. Slide this assembly into the cylindrical interior cavity 18. Attach the upper section 16 with the biasing mechanism 70 to the lower section 14 and screw the assembly down until the retainer plate 72 rests firmly against the movable seal support 54. Tighten the upper section 16 an additional one-quarter turn. Do not overtighten the upper section.

The bomb may be exposed to microwave radiation in any conventional microwave oven. The heating time used with the bomb will vary according to the power rating of the oven.

For example, the following observations were made in tests with a 400-watt, 14-liter microwave oven: 3 ml of concentrated nitric acid was heated to boiling in 15 seconds; 3 ml of water of water was heated to boiling in 30 seconds; a 50-mg organic sample in 3 ml of concentrated nitric acid was completely digested in 30 seconds. At 45 seconds, using the above loading, the pressure within the bomb 10 exceeded 1500 psi and the biasing mechanism 70 released the sliding seal 56 to the non-sealing position in FIG. 4 so as to release the internal pressure. If more than one bomb is heated in an oven, additional exposure will be required. The variables affecting heating, i.e., wattage of the oven and oven loading, may not affect the heating time in a strictly linear relationship. Therefore, careful observation of the visual indicator 76 is necessary.

After heating the bomb, the bomb should not be opened until it has completely cooled. The upper section 16 should be unscrewed carefully. If there is any residual pressure in the reaction chamber, it will be vented before the upper section is completely disengaged. The liner 44 can be dislodged from the receptacle 18 by applying an upward force through the access passage 20.

Other variations and embodiments of the bomb 10 described above are contemplated. These variations include changes in the size and type of microwave-transmissible materials used in its construction. Therefore, the invention is not to be limited by the above disclosure but is to be determined in scope of the claims which follow.

We claim:

1. A pressure and temperature reaction vessel comprising:
    a containment housing having a first portion and a second portion respectively engageable so as to define a reaction chamber wherein the first portion has vent means for venting the reaction chamber;
    a three position movable seal, sequentially operable through a first sealing position and a second sealing position to seal the reaction chamber from the vent means when pressure in the reaction chamber is less than a preselected maximum pressure, and through a third non-sealing position to fluidly communicate the reaction chamber with the vent means when pressure in the reaction chamber exceeds the preselected maximum pressure; and
    a visual indicator, operatively associated with the movable seal, to indicate the position of the movable seal whereby pressure within the reaction chamber can be visually determined.

2. The reaction vessel of claim 1 wherein the containment housing, movable seal, and visual indicator are constructed from substantially microwave-transmissible materials.

3. The reaction vessel of claim 1, including biasing means for biasing the movable seal to the first position and for applying a reaction force on the movable seal which is responsive to pressure within the reaction chamber.

4. The reaction vessel of claim 3 wherein the containment housing, movable seal, visual indicator, and biasing means are constructed from substantially microwave-transmissible materials.

5. The reaction vessel of claim 3 wherein the reaction chamber has a circular wall defining a sealing surface having a first diameter and also defining an O-ring receptacle position having a larger second diameter, wherein the movable seal includes a movable O-ring support having a circular shoulder sized to accept an O-ring seal, wherein an O-ring seal received in the circular shoulder has an outer diameter slightly greater than the sealing surface first diameter so as to form a sliding interference fit therewith when the movable seal is between the first and second sealing positions, and wherein the O-ring resides in the seal receptacle when the movable seal has been displaced to the non-sealing position by pressure within the reaction chamber which exceeds the preselected maximum pressure.

6. The reaction vessel of claim 5 wherein the biasing means includes a circular disk of elastomeric material.

7. A pressure and temperature reaction vessel for chemical and physical reactions, comprising:
    a containment housing constructed from substantially microwave-transmissible materials, having a base and a removable lid together defining a reaction chamber;
    a sealing means mounted to move between different first and second sealing positions for sealing the reaction chamber; and
    a substantially microwave-transmissible self-resetting visual indicator means, for indicating various different pressures within the reaction chamber.

8. The reaction vessel of claim 7, including substantially microwave-tranmissible vent means for venting the reaction chamber when pressure therein exceeds a preselected limit.

9. A method for heating and reacting reactants in a pressure and temperature reaction vessel, comprising the steps of:
    placing reactants in a substantially microwave-transmissible pressure and temperature reaction vessel, wherein the vessel has a seal mounted to move between at least two distinct sealing positions and an operably connected visual indicator for indicating various different pressures within the reaction chamber and means for venting the reaction chamber if pressure exceeds a preselected limit;
    exposing the vessel to microwaves to heat the reactants and pressurize the reaction chamber; and
    monitoring the visual indicator to determine various pressures within the vessel during and after the microwave exposure step.

10. A pressure and temperature reaction vessel for reactants, comprising:
    a containment housing having a first portion engageable with a second portion so as to define a receptacle, wherein the first portion has vent means for venting the receptacle;
    a liner, removably received in and supported by the receptacle and having a circular side wall, a closed bottom, and an open top, wherein the circular side wall has an inner surface adjacent to the open top defining a sealing surface;
    a three position movable liner lid having a circular seal shoulder and an annular seal received on the seal shoulder, wherein the annular seal is sized to slidably abut the sealing surface through first and second sealing positions to seal the liner from the vent means so as to define a reaction chamber and is movable to a third non-sealing position to fluidly communicate the reaction chamber with the vent means;
    biasing means for biasing the annular seal to the first sealing position and for applying a reaction force to the movable liner lid in response to pressure within the reaction chamber; and
    an external visual indicator, operatively associated with the liner lid and the biasing means, to indicate the sealing position of the annular seal and pressure within the reaction chamber.

11. The vessel of claim 10 wherein the housing first portion has a bore therethrough, wherein the biasing means includes an elastic member having two opposite sides, one side positioned adjacent to the housing first portion, a retaining plate positioned adjacent to the other side of the elastic member, and wherein the external visual indicator has an elongated portion reciprocally received in the bore, a first end portion connected to the retaining plate and a second end portion extendible out of the bore as the annular seal is displaced from the first sealing position.

12. The vessel of claim 10 wherein the containment housing has a counterbore in the receptacle adjacent to the open top of the liner circular side walls so that the circular side wall will become unsupported if the liner experiences substantial thermal expansion, whereby the reaction chamber is communicable with the vent means while the annular seal is between the first and second sealing positions.

13. A pressure and temperature reaction vessel comprising:
 a containment housing having a first portion and a second portion respectively engageable so as to define a reaction chamber wherein the first portion has vent means for venting the reaction chamber; and
 a three position movable seal, sequentially operable through a first sealing position and a second sealing position to seal the reaction chamber from the vent means when pressure in the reaction chamber is less than a preselected maximum pressure, and through a third non-sealing position to fluidly communicate the reaction chamber with the vent means when pressure in the reaction chamber exceeds the preselected maximum pressure.

14. The reaction vessel of claim 13 wherein the containment housing and movable seal are constructed from substantially microwave-transmissible materials.

* * * * *